United States Patent [19]

Harrison et al.

[11] Patent Number: 4,964,452
[45] Date of Patent: Oct. 23, 1990

[54] PNEUMATIC TIRES

[76] Inventors: Danny E. Harrison, 11982 Shoshone Ave., NW, Uniontown, Ohio 44685; Joseph Zekoski, 2788 Laurel Woods Blvd., Stow, Ohio 44224

[21] Appl. No.: 309,940

[22] Filed: Feb. 13, 1989

Related U.S. Application Data

[63] Continuation of Ser. No. 111,249, Oct. 22, 1987, abandoned.

[51] Int. Cl.$^5$ .............................................. B60C 15/00
[52] U.S. Cl. .................................... 152/554; 152/548; 152/552; 152/555
[58] Field of Search ............... 156/548, 554, 555, 552, 156/539

[56] References Cited

U.S. PATENT DOCUMENTS

| | | | |
|---|---|---|---|
| 3,253,636 | 5/1966 | Travers | 152/555 X |
| 3,253,639 | 5/1966 | Travers | 152/554 X |
| 3,392,773 | 7/1968 | Warren et al. | 152/541 |
| 3,888,292 | 6/1975 | Menell et al. | 152/542 |
| 3,895,666 | 7/1975 | Inoue | 152/543 |
| 4,139,040 | 2/1979 | Samoto et al. | 152/353 R |
| 4,234,029 | 11/1980 | Peter et al. | 152/542 |
| 4,446,904 | 5/1984 | Kishida et al. | 152/542 |
| 4,471,828 | 9/1984 | Kishida et al. | 152/541 |
| 4,510,984 | 4/1985 | Kishida et al. | 152/541 |
| 4,609,023 | 9/1986 | Loser | 152/454 |

FOREIGN PATENT DOCUMENTS

| | | |
|---|---|---|
| 1505025 | 4/1969 | Fed. Rep. of Germany . |
| 2364804 | 11/1974 | Fed. Rep. of Germany . |
| 2718710 | 11/1977 | Fed. Rep. of Germany . |
| 3215873 | 10/1982 | Fed. Rep. of Germany . |
| 3222405 | 2/1983 | Fed. Rep. of Germany . |
| 3617880 | 6/1986 | Fed. Rep. of Germany . |
| 1276298 | 6/1972 | United Kingdom . |
| 1520952 | 4/1978 | United Kingdom . |
| 2035228 | 7/1980 | United Kingdom . |
| 1583977 | 1/1981 | United Kingdom . |

*Primary Examiner*—Michael W. Ball
*Assistant Examiner*—Jeff H. Aftergut

[57] ABSTRACT

A pneumatic tire has a carcass ply (12) of cables of a high tensile material have stiffening members (21,22) of a textile material disposed on each side and adjacent to the turn-up portions (27) of the carcass ply. The textile cords in one stiffening member are oriented in an opposite manner from the cords of the other stiffening member with respect to a circumferential line of the tire.

15 Claims, 4 Drawing Sheets

PNEUMATIC TIRES

This application is a continuation of Ser. No. 111,249, filed Oct. 22, 1987, now abandoned.

The present invention relates generally to pneumatic tires and more specifically to the bead portions of pneumatic tires.

The edges of the turn-up portions of the carcass ply, or plies, of a radial ply tire can be locations for the concentration of stresses during the operation of the tire. Such stress concentrations may eventually lead to degradation of the tire structure at that location. The concentration of stresses, at the carcass ply edges, is reduced in the present invention with the desirable result that the rate of degradation of the tire at those locations is decreased.

There is provided in accordance with one aspect of the present invention a pneumatic tire having a pair of axially spaced apart annular bead cores. A carcass ply of side-by-side cables of a high tensile material comprises a central portion and a pair of turn-up portions. Each of the bead cores has one of the turn-up portions folded axially and radially outwardly about it. Each of the turn-up portions includes a lateral edge of the carcass ply. The cables of the carcass ply intersect a mid-circumferential plane of the tire at angles in the range of 75° to 90° with respect to said mid-circumferential plane. Each turn-up portion of the carcass ply has a pair of annular stiffening members associated therewith. The first annular stiffening member is disposed axially inwardly of, and adjacent to, the turn-up portion of the carcass ply. The second annular stiffening member is disposed axially outwardly of, and adjacent to, the turn-up portion of the carcass ply. Each of the stiffening members has a radially innermost edge which is disposed radially inwardly of the associated lateral edge of the carcass ply a radially measured distance of at least 5 mm with each of the stiffening members located entirely axially outwardly of the associated bead core. Each of the stiffening members has a radially outermost edge which is disposed radially outwardly of the associated lateral edge of the carcass ply a radially measured distance in the range of 5 mm to 45 mm. Each of the stiffening members comprises side-by-side cords of a textile material with said cords oriented in the range of 20° to 40° with respect to a circumferential line of the tire.

There is provided in accordance with another aspect of the invention a tubeless pneumatic tire having a pair of axially spaced apart annular bead cores. A single carcass ply of side-by-side steel cables has a central portion and a pair of turn-up portions. Each of the bead cores has one of the turn-up portions folded axially and radially outwardly about it. Each of the turn-up portions included a lateral edge of the carcass ply, with said lateral edges disposed radially outwardly of the nominal bead diameter of the tire a radially measured distance in the range of 5% to 25% of the section height of the tire. The steel cables of the carcass ply intersect a mid-circumferential plane of the tire at angles in the range of 75° to 90° with respect to said mid-circumferential plane. An annular elastomeric apex member is interposed between each of the turn-up portions and the central portion of the carcass ply. Each turn-up portion of the carcass ply has a pair of annular stiffening members associated therewith. The first stiffening member is interposed between the apex member and the turn-up portion of the carcass ply. The second stiffening member is disposed axially outwardly of and adjacent to the turn-up portion of the carcass ply. Each stiffening member has a radially innermost edge which is disposed radially inwardly of the associated lateral edge of the carcass ply a radially measured distance in the range of 5 mm to 35 mm with each of the stiffening members being entirely located axially outwardly of the axially outermost extent of the associated bead core. Each stiffening member has a radially outermost edge which is disposed radially outwardly of the associated lateral edge of the carcass ply a radially measured distance in the range of 5 mm to 35 mm. Each of the stiffening members comprise side-by-side nylon cords oriented in the range of 25° to 35° with respect to a circumferential line of the tire. The cords of the first and second stiffening members are oriented in opposite manners with respect to said circumferential line of the tire.

There is provided in accordance with yet another aspect of the invention a tube-type pneumatic tire having a pair of axially spaced apart annular bead cores. A single carcass ply of side-by-side steel cables has a central portion and a pair of turn-up portions. Each of the bead cores has one of the turn-up portions folded axially and radially outwardly about it. Each of the turn-up portions includes a lateral edge of the carcass ply, with said lateral edges disposed radially outwardly of the nominal bead diameter of the tire a radially measured distance in the range of 10% to 30% of the section height of the tire. The steel cables of the carcass ply intersect a mid-circumferential plane of the tire at angles in the range of 75° to 90° with respect to said mid-circumferential plane. An annular apex member is interposed between each of the turn-up portions and the central portion of the carcass ply. Each turn-up portion of the carcass ply has a pair of annular stiffening members associated therewith. The first stiffening member is interposed between the apex member and the turn-up portion of the carcass ply. The second stiffening member is disposed axially outwardly of and adjacent to the turn-up portion of the carcass ply. Each stiffening member has a radially innermost edge which is disposed radially inwardly of the associated lateral edge of the carcass ply a radially measured distance in the range of 5 mm to 35 mm with each of the stiffening members being entirely located axially outwardly of the axially outermost extent of the associated bead core. Each stiffening member has a radially outermost edge which is disposed radially outwardly of the associated lateral edge of the carcass ply a radially measured distance in the range of 5 mm to 35 mm. Each of the stiffening members comprise side-by-side nylon cords oriented in the range of 25° to 35° with respect to a circumferential line of the tire. The cords of the first and second stiffening members are oriented in opposite manners with respect to said circumferential line of the tire.

There is provided in accordance with yet another aspect of the invention a tubeless pneumatic tire having a pair of axially spaced apart annular bead cores. A single carcass ply of side-by-side steel cables has a central portion and a pair of turn-up portions. Each of the bead cores has one of the turn-up portions folded axially and radially outwardly about it. Each of the turn-up portions includes a lateral edge of the carcass ply, with said lateral edges disposed radially outwardly of the nominal bead diameter of the tire a radially measured distance in the range of 10% to 30% of the section height of the tire. The steel cables of the carcass ply intersect a mid-circumferential plane of the tire at angles in the range of 75° to 90° with respect to said mid-circumferential plane. An annular apex member is interposed between each of the turn-up portions and the central portion of the carcass ply. Each turn-up portion of the carcass ply has a pair of annular stiffening members which are not folded about a bead core associated therewith. Each of the apex members extends radially outwardly of both of the associated stiffening members. The first stiffening member is interposed between the apex member and the turn-up portion of the carcass ply. The second stiffening member is disposed axially outwardly of and adjacent to the turn-up portion of the carcass ply. Each stiffening member has a radially innermost edge which is disposed radially inwardly of the associated lateral edge of the carcass ply a radially measured distance in the range of 5 mm to 35 mm with each of the stiffening members being entirely located axially outwardly of the axially outermost extent of the associated bead core. Each stiffening member has a radially outermost edge which is disposed radially outwardly of the associated lateral edge of the carcass ply a radially measured distance in the range of 5 mm to 35 mm. Each of the stiffening members comprise side-by-side nylon cords oriented in the range of 25° to 35° with respect to a circumferential line of the tire. The cords of the first and second stiffening members are oriented in opposite manners with respect to said circumferential line of the tire. An elastomeric reinforcing member is disposed axially inwardly of the central portion of the carcass ply and has a radial extent that is substantially the same as the radial extent of the elastomeric apex member.

The features of the present invention which are believed to be novel are set forth with particularity in the appended claims. The present invention, both as to its structure and manner of operation, may best be understood by referring to the following detailed description, taken in accordance with the accompanying drawings in which:

Figure 1:
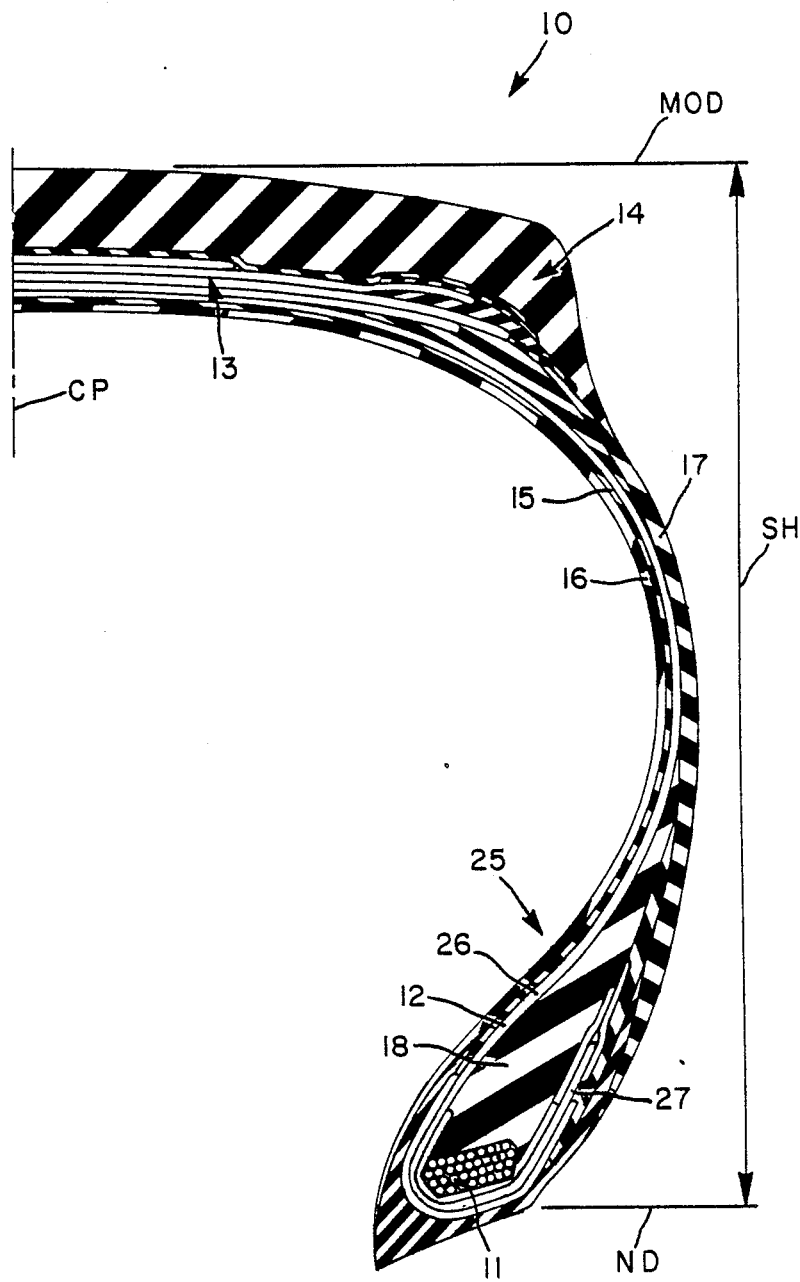
FIG. 1 is a partial cross-sectional view of a tire.

A tubeless pneumatic tire 10 of size 295/75R22.5 according to the invention is shown in FIG. 1 in a partial section taken in a plane that contains the axis of rotation of the tire. While only the portion of the tire located on one side of the mid-circumferential plane CP is illustrated in FIG. 1, it is understood that at least with respect to its bead portions 25 a tire according to the invention is substantially symmetrical with respect to its mid-circumferential centerplane. As used herein and in the claims the mid-circumferential centerplane CP of the tire is a plane which is perpendicular to the axis of rotation of a tire and is located midway between the sidewalls of the tire.

A pneumatic tire according to the invention has a pair of axially spaced apart annular bead cores 11. While the bead cores of the tire in this embodiment have a hexagonal cross-section, it is understood that the invention may be practiced with tires having bead cores of other cross-sectional shapes such as circular, square or oblong.

As used herein, and in the claims, the terms "axial" and "axially" refer to directions that are parallel to the axis of rotation of a tire, and the terms "radial" and "radially" refer to directions that are perpendicular to the axis of rotation of the tire.

A carcass ply 12 of side-by-side cables of high tensile material extends between the bead cores 11. As used herein "high tensile" is understood to refer to either a metallic material having a tensile breaking strength of at least 260 kg/mm$^2$ or an organic material having a tensile strength of at least 15 gm/denier. In each of the embodiments illustrated herein, the cables comprise steel, but they could comprise any suitable high tensile material such as aramid. The cables of the carcass ply 12 intersect the mid-circumferential plane CP at angles in the range of 75° to 90° with respect to said mid-circumferential centerplane.

As used herein and in the claims the nominal bead diameter ND of a tire is understood to mean the nominal diameter of the bead seats of a rim that a tire is specified to be mounted upon. For example, the tire illustrated in FIG. 1 is of a size 295/75R22.5 and has a nominal bead diameter of 22.5 inches (57 cm).

As used herein and in the claims, the section height SH of a tire is understood to mean one-half of the difference between the maximum outside diameter of the tire MOD, when it is mounted upon its specified rim and inflated to its specified inflation pressure but not subjected to any load, and the nominal bead diameter ND of the tire.

A belt package 13 is disposed radially outwardly of the carcass ply 12 in a crown portion of the tire. In the tire illustrated herein, the belt package comprises unfolded plies of steel cables, but it is understood that a tire designer may practice the invention in a tire having any suitable belt package for a particular tire application. A ground engaging tread portion 14 is disposed radially outwardly of the belt package 13.

Inasmuch as the illustrated preferred embodiments each have a single carcass ply 12 of steel cables, it is desirable to have a substantially moisture impervious barrier layer 15 disposed inwardly of the carcass ply to inhibit corrosion of the steel cables of the carcass ply. If, as in the embodiment illustrated in FIG. 1, the tire is of the tubeless variety a substantially air impervious innerliner 16 is also disposed inwardly of the carcass ply. A layer 17 of sidewall rubber is disposed axially outwardly of the carcass ply in each sidewall of the tire.

Further details of the invention may best be described with reference to FIG. 2 which is an enlarged cross-sectional view of a bead portion of the tire illustrated in FIG. 1.

The carcass ply has a central portion 26 and a pair of turn-up portions 27. Each of the turn-up portions 27 is folded axially and radially outwardly about a bead core 11. Each turn-up portion 27 of the carcass ply 12 terminates at a lateral edge of the carcass ply, with the lateral edges of the carcass ply being disposed radially outwardly of the nominal bead diameter ND of the tire a radially measured distance A in the range of 5% to 30%, preferably 10% to 25%, of the section height SH of the tire. For example in the 295/75R22.5 tire illustrated in FIGS. 1 and 2 the distance A is 16.0% of the section height SH.

An annular elastomeric apex member 18 is interposed between each of the turn-up portions 27 of the carcass ply and the central portion 26 of the carcass ply. In the preferred embodiment illustrated herein a protective layer 19, comprising square woven nylon fabric embedded in rubber that contains nylon flock, is interposed between the bead core 11 and the steel cables of the carcass ply 12 to prevent the steel cables from abrading against the bead core. The cables of the carcass ply are protected from chafing against a rim by a chafer strip 20 that is disposed on the side of the carcass ply that is distal from the bead core 11. The chafer strip 20 is reinforced by metal wires oriented at about 23° with respect to a circumferential line of the tire. As used herein and in the claims a "circumferential line of the tire" is a circle in a plane that is perpendicular to the axis of rotation of the tire, with the center of the circle being located on said axis of rotation. A layer 24 of an elastomeric compound which is especially tough and hard to resist chafing forms the outer layer of the radially inner portion of the tire bead portion. If desired, this outer layer 24 may be fabric reinforced, for example with square woven nylon (not shown).

Each turn-up portion 27 of the carcass ply 12 has a pair of annular stiffening members 21,22 associated therewith. It is critical that said stiffening members 21,22 are entirely located axially outwardly of the axially outermost extent X of the associated bead core 11 because when a member is compressed between a rim and a bead core it can tend to result in a higher stress concentration at an edge of that member. Put another way, each of the stiffening members 21,22 in its entirety is located such that it will not be radially interposed between a bead core 11 and the radially innermost surface 28 of the bead portion 25 of the tire. The first annular stiffening member 21 is disposed axially inwardly of and adjacent to the turn-up portion 27 of the carcass ply. In a preferred embodiment, the first stiffening member 21 is interposed between the annular elastomeric apex member 18 and the turn-up portion 27 of the carcass ply. The second stiffening member 22 is disposed axially outwardly of and adjacent to the turn-up portion 27 of the carcass ply.

Each of the stiffening members 21,22 comprises side-by-side cords of a textile material with said cords oriented in the range of 20° to 40°, preferably in the range of 25° to 35°, with respect to a circumferential line of the tire. In a preferred embodiment in which the single carcass ply comprises steel cables, the textile cords of the stiffening members comprise nylon.

Each of the stiffening members 21,22 has a radially innermost edge which is disposed radially inwardly of the associated lateral edge of the carcass ply a radially measured distance B,C in the range of 5 mm to 35 mm with each of the stiffening members being entirely located axially outwardly of the axially outermost extent X of the associated bead core, preferably in the range of 10 mm to 30 mm so long as each of the stiffening members is entirely located axially outwardly of the axially outermost extent X of the associated bead core. For example, in the 295/75R22.5 tire illustrated in FIGS. 1 and 2, the distance B is 23 mm and the distance C is 13 mm. Each of the stiffening members has a radially outermost edge which is disposed radially outwardly of the associated lateral edge of the carcass ply a radially measured distance D,E in the range of 5 mm to 45 mm, preferably in the range of 10 mm to 30 mm. For example, in the tire illustrated in FIGS. 1 and 2, the distance D is 13 mm and the distance E is 23 mm.

Preferably, the radially innermost edges of the first and second stiffening members 21,22 are radially spaced apart from one another a radially measured distance F in the range of 5 mm to 15 mm. In the tire illustrated in FIGS. 1 and 2 this distance F is 10 mm. Preferably, the radially outermost edges of the first and second stiffening members are spaced radially apart from one another a radially measured distance G in the range of 5 mm to 15 mm. In the tire illustrated in FIGS. 1 and 2, this distance G is 10 mm.

In the past, it has been known, for example from U.S. Pat. No. 3,392,773 to employ stiffening members comprising strips of rubber. Tests have indicated that tires made according to the invention have significantly better bead durability than tires having only rubber stiffening members that were not reinforced with textile cords.

Figure 2:
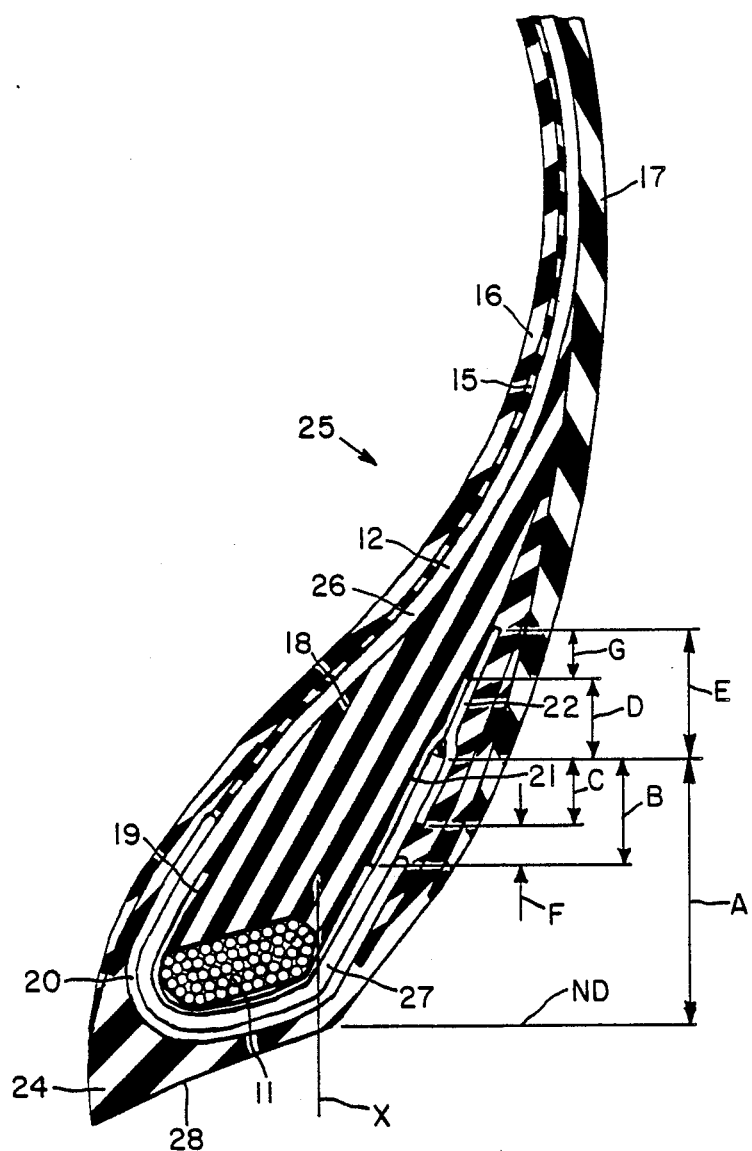
FIG. 2 is an enlarged view of a bead portion of the tire of FIG. 1.
Figure 3:
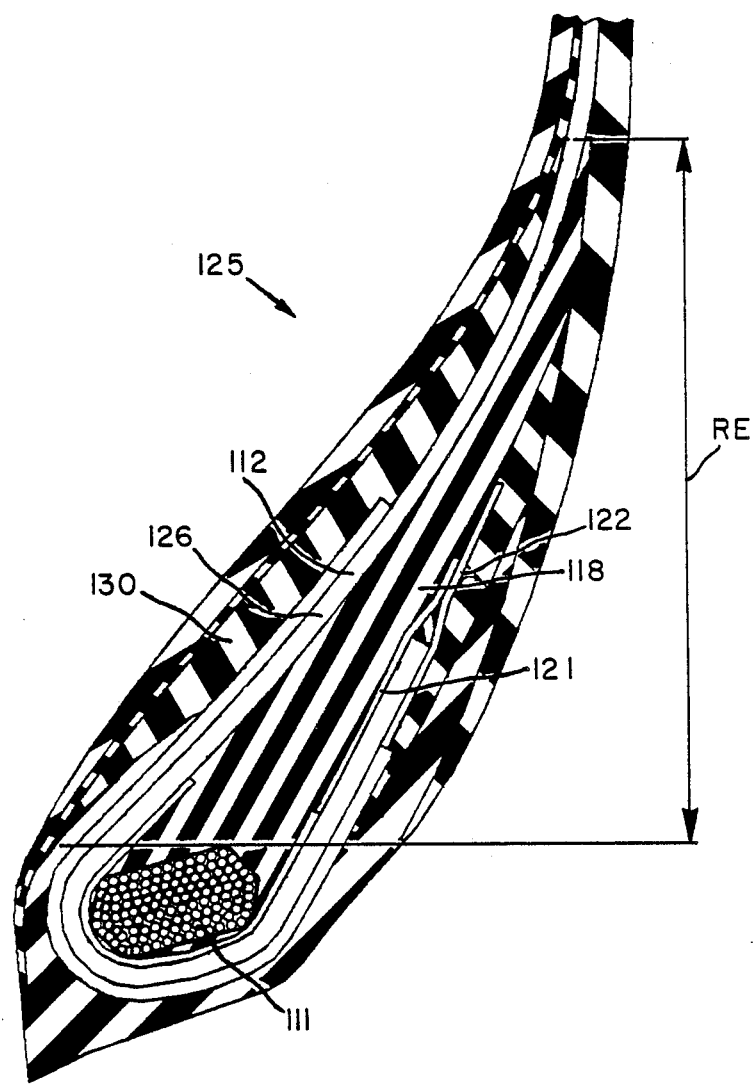
FIG. 3 is a view of the bead portion of a tire according to another embodiment of the invention.

FIG. 3 is a cross-sectional view of the bead portion 125 of a tubeless tire according to another preferred embodiment taken in a plane that contains the axis of rotation of the tire. This embodiment of the invention is substantially the same as the embodiment illustrated in FIGS. 1 and 2 and further comprises an elastomeric reinforcing member 130 disposed axially inwardly of the central portion 126 of a single carcass ply 112 of side-by-side steel cables. It is preferred that the radial extent RE of the elastomeric reinforcing member 130 be substantially the same as the radial extent of the elastomeric apex member 118, it being most preferred that each apex member 118 extends radially outwardly of both of the associated stiffening members 121,122.

It is understood for the purposes of describing and claiming the present invention that the radial extents RE of both the elastomeric reinforcing member 130 and the elastomeric apex member 118 refers to the radially measured distance RE from the radially outermost point on the bead core 111 to the radially outermost edges of the reinforcing member 130 and apex member 118. The radial extents RE are understood to be substantially the same as long as they do not differ by more than 10%.

The use of a reinforcing member 130 axially inwardly of the central portion of a carcass ply to facilitate the carcass ply in its attempt to conform to its natural shape when the tire is inflated, thus improving the durability of the tire by reducing inflation strains caused thereon is known from U.S.A. Pat. No. 4,609,023.

A tubeless tire according to this embodiment has the lateral edges of the carcass ply 12 and the associated stiffening strips 121,122 arranged in the same manner as in the embodiment illustrated in FIGS. 1 and 2 and described herein.

Figure 4:
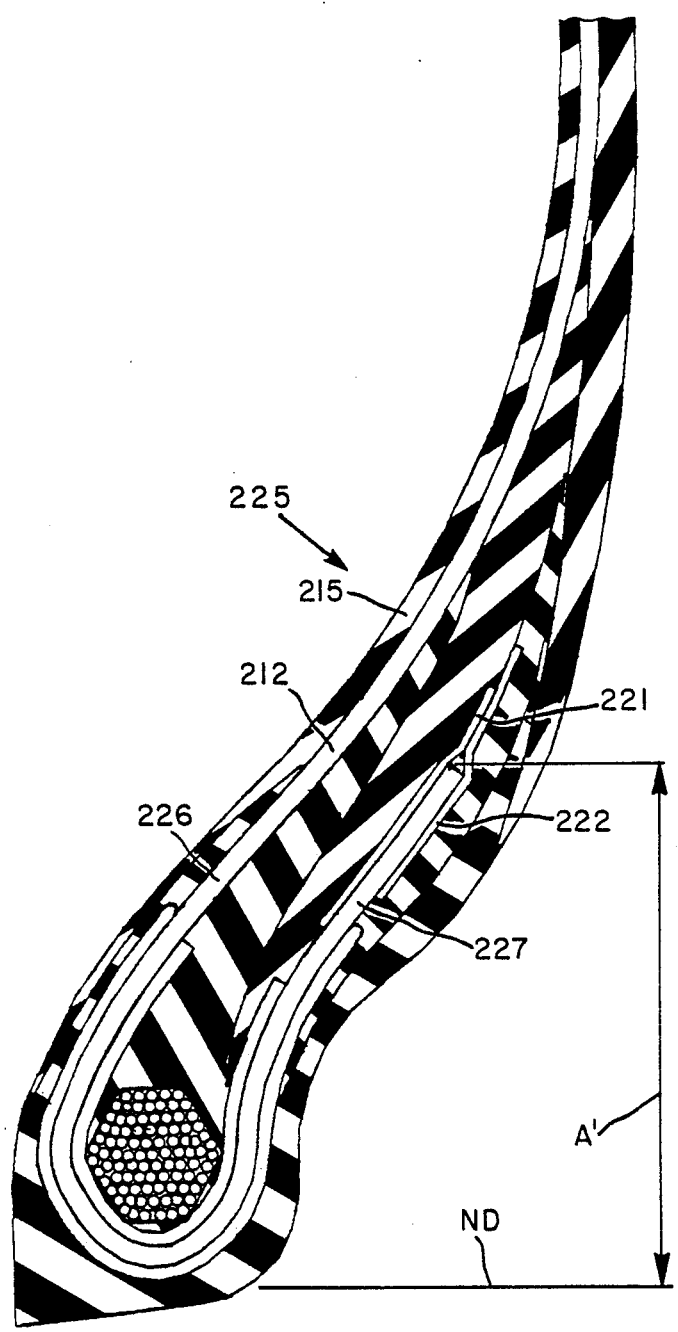
FIG. 4 is a view of the bead portion of a tire according to yet another embodiment of the invention.

Referring next to FIG. 4, there is illustrated a cross-sectional view of the bead portion 225 of a tube-type tire according to yet another preferred embodiment taken in a plane that contains the axis of rotation of the tire. Of course a tube-type tire does not have an innerliner but it is still desirable to have a substantially moisture impervious barrier layer 215 disposed inwardly of the central portion 226 of the single carcass ply 212 of side-by-side steel cables. As in the other embodiments, the cables of the carcass ply intersect a mid-circumferential plane of the tire at angles in the range of 75° to 90° with respect to the mid-circumferential plane of the tire. The turn-up portions 227 of the carcass ply have lateral edges that are located radially outwardly of the nominal bead diameter ND of the tire a radially measured distance A' in the range of 10% to 30%, preferably 15% to 25% of the section height of the tire. The distance A' for the tube-type tire differs from the corresponding dimension A for a tubeless tire because the rims upon which tube-type tires are mounted have rim flanges of different configurations from the rims used with tubeless tires. However, the location of the stiffening members 221,222 with respect to the associated carcass ply turn-up portion 227 is substantially the same as in the other preferred embodiments described herein.

While preferred embodiments of a tire according to the invention have been shown and described, it will be apparent to those skilled in the art that various changes and modifications may be made therein without deviating from the spirit or scope of this invention.

We claim:
1. A tubeless pneumatic tire comprising:
   (a) a pair of axially spaced apart annular bead cores;
   (b) a single carcass ply of side-by-side steel cables, said carcass ply comprising a central portion and a pair of turn-up portions, each of said bead cores having one of said turn-up portions folded axially and radially outwardly thereabout, each said turn-up portion including a lateral edge of the carcass ply with said lateral edges disposed radially outwardly of the nominal bead diameter of the tire a radially measured distance in the range of 5% to 25% of the section height of the tire, the steel cables of the carcass ply intersecting a mid-circumferential plane of the tire at angles in the range of 75° to 90 ° with respect to said mid-circumferential plane;
   (c) an annular elastomeric apex member inter posed between each said turn-up portion and the central portion of the carcass ply;
   (d) a chafer strip on the side of carcass ply distal from the bead core; and
   (e) each turn-up portion of the carcass ply having a pair of annular stiffening members associated therewith, the first stiffening member being interposed between said elastomeric apex member and said turn-up portion of the carcass ply and the second stiffening member being disposed entirely radially outwardly of the chafer and axially outwardly of and adjacent to the turn-up portion of the carcass ply, each of the stiffening members having a radially innermost edge which is disposed radially inwardly of the associated lateral edge of the carcass ply a radially measured distance in the range of 5 mm to 35 mm with each of the stiffening members being entirely located axially outwardly of the axially outermost extent of the associated bead core, each said stiffening member having a radially outermost edge which is disposed radially outwardly of the associated lateral edge of the carcass ply a radially measured distance in the range of 5 mm to 35 mm, each said stiffening member comprising side-bu-side nylon cords oriented in the range of 25° to 35° with respect to a circumferential line of the tire, the cords of said first and second stiffening members being oriented in opposite manners with respect to said circumferential line of the tire.

2. A tubeless pneumatic tire according to claim 1 wherein the radially outermost edge of the second stiffening member is disposed radially outwardly of the radially outermost edge of the first stiffening member.

3. A tubeless pneumatic tire according to claim 2 wherein the radially innermost edge of the second stiffening member is disposed radially outwardly of the radially innermost edge of the first stiffening member.

4. A tubeless pneumatic tire according to claim 1 wherein the radially innermost edges of the first and second stiffening members are separated from one another a radially measured distance in the range of 5 mm to 15 mm and the radially outermost edges of the first and second stiffening members are separated from one another a radially measured distance in the range of 5 mm to 15 mm.

5. A tubeless pneumatic tire according to claim 3 wherein the radially innermost edges of the first and second stiffening members are separated from one another a radially measured distance in the range of 5 mm to 15 mm, and the radially outermost edges of the first and second stiffening members are separated from one another a radially measured distance in the range of 5 mm to 15 mm.

6. A tubeless pneumatic tire according to any one of claims 1 to 5 further comprising an elastomeric reinforcing member disposed axially inwardly of the central portion of the carcass ply, the radial extent of said elastomeric reinforcing member being substantially the same as the radial extent of said elastomeric apex member.

7. A tube-type pneumatic tire comprising:
   (a) a pair of axially spaced apart annular bead cores;
   (b) a single carcass ply of side-by-side steel cables, said carcass ply comprising a central portion and a pair of turn-up portions folded axially and radially outwardly thereabout, each said turn-up portion including a lateral edge of the carcass ply with said lateral edges disposed radially outwardly of the nominal bead diameter of the tire a radially measured distance in the range of 10% to 30% of the section height of the tire, the steel cables of the carcass ply intersecting a mid-circumferential plane of the tire at angles in the range of 75° to 90 ° with respect to said mid-circumferential plane;
   (c) an annular elastomeric apex member interposed between each of said turn-up portions and the central portion of the carcass ply;
   (d) a chafer strip on the side of the carcass ply distal from the bead core; and
   (e) each turn-up portion of the carcass ply having a pair of annular stiffening members associated therewith, the first stiffening member being interposed between said elastomeric apex member and said turn-up portion of the carcass ply and the second stiffening member being disposed entirely radially outwardly of the chafer and axially outwardly of and adjacent to the turn-up portion of the carcass ply, each of the stiffening members having a radially innermost edge which is disposed radially inwardly of the associated lateral edge of the carcass ply a radially measured distance in the range of 5 mm to 35 mm with the entire stiffening member being disposed axially outwardly of the axially outermost extend of the associated bead core, each said stiffening member having a radially outermost edge which is disposed radially outwardly of the associated lateral edge of the carcass ply a radially measured distance in the range of 5 mm to 35 mm, each said stiffening member comprising side-by-side nylon cords oriented in the range of 25° to 35° with respect to a circumferential line of the tire, the cords of said first and second stiffening members being oriented in opposite manners with respect to said circumferential line of the tire.

8. A tube-type pneumatic tire according to claim 7 wherein the radially outermost edge of the second stiffening member is disposed radially outwardly of the radially outermost edge of the first stiffening member.

9. A tube-type pneumatic tire according to claim 8 wherein the radially innermost edge of the second stiffening member is disposed radially outwardly of the radially innermost edge of the first stiffening member.

10. A tube-type pneumatic tire according to claim 8 wherein the radially innermost edges of the first and second stiffening members are separated from one another a radially measured distance in the range of 5 mm to 15 mm and the radially outermost edges of the first and second stiffening members are separated from one another a radially measured distance in the range of 5 mm to 15 mm.

11. A tube-type pneumatic tire according to claim 9 wherein the radially innermost edges of the first and second stiffening members are separated from one another a radially measured distance in the range of 5 mm to 15 mm, and the radially outermost edges of the first and second stiffening members are separated from one another a radially measured distance in the range of 5 mm to 15 mm.

12. A tubeless pneumatic tire comprising:
 (a) a pair of axially spaced apart annular bead cores;
 (b) a single carcass ply of side-by-side steel cables, said carcass ply comprising a central portion and a pair of turn-up portions, each of said bead cores having one of said turn-up portions folded axially and radially outwardly thereabout, each said turn-up portion including a lateral edge of the carcass ply with said lateral edges disposed radially outwardly of the nominal bead diameter of the tire a radially measured distance in the range of 5% to 25% of the section height of the tire, the steel cables of the carcass ply intersecting a mid-circumferential plane of the tire at angles in the range of 75° to 90° with respect to said mid-circumferential plane;
 (c) an annular elastomeric apex member interposed between each of said turn-up portions and the central portion of the carcass ply;
 (d) a chafer strip on the side of the carcass ply distal from the bead core;
 (e) each turn-up portion of the carcass ply having a pair of annular stiffening members which are not folded about a bead core associated therewith, the first stiffening member being interposed between said elastomeric apex member and said turn-up portion of the carcass ply and the sound stiffening member being disposed entirely radially outwardly of the chafer and axially outwardly of and adjacent to the turn-up portion of the carcass ply, each of the stiffening members having a radially innermost edge which is disposed radially inwardly of the associated lateral edge of the carcass ply a radially measured distance in the range of 5 mm to 35 mm with the entire stiffening member being disposed axially outwardly of the axially outermost extend of the associated bead core, each said stiffening member having a radially outermost edge which is disposed radially outwardly of the associated lateral edge of the carcass ply a radially measured distance in the range of 5 mm to 35 mm, each said stiffening member comprising side-by-side nylon cords oriented in the range of 25° to 35° with respect to a circumferential line of the tire, the cords of said first and second stiffening members being oriented in opposite manners with respect to said circumferential line of the tire, each said apex member extending radially outwardly of both of the associated stiffening members; and
 (f) an elastomeric reinforcing member disposed axially inwardly of the central portion of the carcass ply, the radial extent of said elastomeric reinforcing member being substantially the same as the radial extent of said elastomeric apex member.

13. A tubeless pneumatic tire according to claim 12 wherein the radially outermost edge of the second stiffening member is disposed radially outwardly of the radially outermost edge of the first stiffening member.

14. A tubeless pneumatic tire according to claim 13 wherein the radially innermost edge of the second stiffening member is disposed radially outwardly of the radially innermost edge of the first stiffening member.

15. A tubeless pneumatic tire according to any one of claims 12 to 14 wherein the radially innermost edges of the first and second stiffening members are spaced from one another a radially measured distance in the range of 5 mm to 15 mm and the radially outermost edges of the first and second stiffening members are spaced from one another a radially measured distance in the range of 5 mm to 15 mm.

* * * * *